Figure 1:
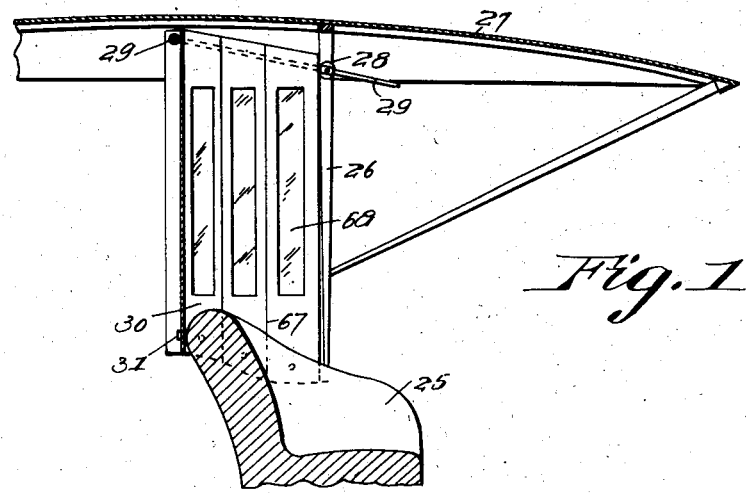

W. C. SWEET.
DIVIDING CURTAIN FOR VEHICLE TOPS.
APPLICATION FILED JUNE 7, 1913.

1,111,813.
Patented Sept. 29, 1914.
3 SHEETS—SHEET 1.

W. C. SWEET.
DIVIDING CURTAIN FOR VEHICLE TOPS.
APPLICATION FILED JUNE 7, 1913.
1,111,813.
Patented Sept. 29, 1914.
3 SHEETS—SHEET 2.
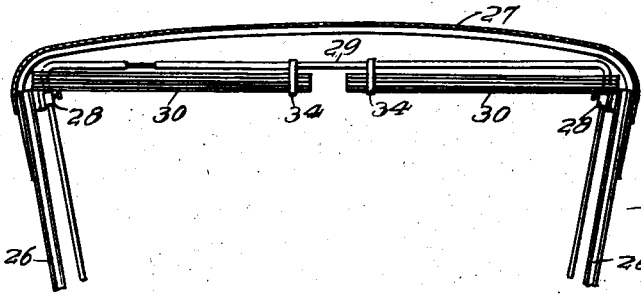
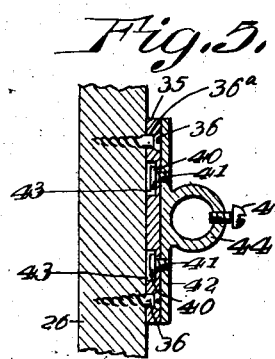
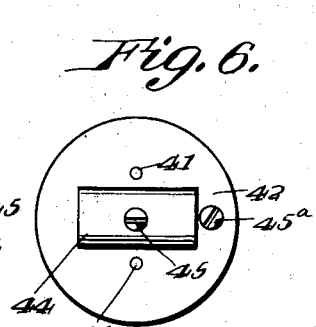
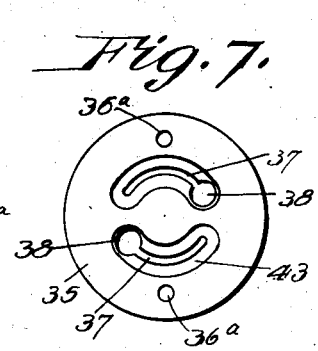
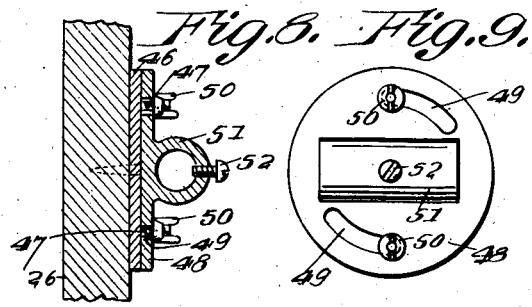
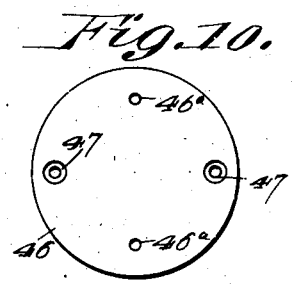
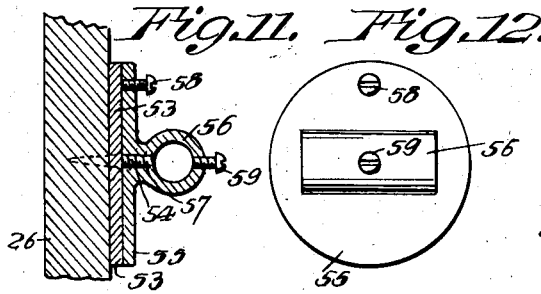
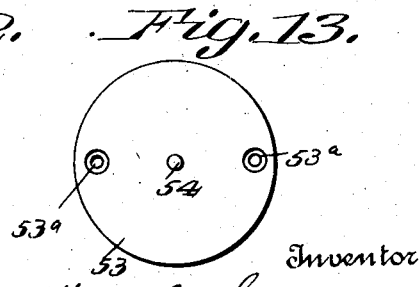

W. C. SWEET.
DIVIDING CURTAIN FOR VEHICLE TOPS.
APPLICATION FILED JUNE 7, 1913.

1,111,813.

Patented Sept. 29, 1914.

3 SHEETS—SHEET 3.

Witnesses
Inventor
Webt C. Sweet,
by Franks. Annerman,
Attorney

UNITED STATES PATENT OFFICE.

WEBB C. SWEET, OF WASHINGTON, DISTRICT OF COLUMBIA.

DIVIDING CURTAIN FOR VEHICLE-TOPS.

1,111,813.  Specification of Letters Patent.  Patented Sept. 29, 1914.

Application filed June 7, 1913. Serial No. 772,394.

*To all whom it may concern:*

Be it known that I, WEBB C. SWEET, a citizen of the United States of America, and resident of Washington, in the District of Columbia, have invented certain new and useful Improvements in Dividing Curtains for Vehicle-Tops, of which the following is a specification.

This invention relates to vehicles and particularly to vehicle tops, the invention relating specifically to dividing curtains for vehicle tops, the said invention being of especial importance in connection with automobile tops.

An object of this invention is to provide a dividing curtain and fixtures therefor, whereby the said dividing curtain may be installed in a vehicle top in a manner to permit the said dividing curtain to be folded so that the vehicle top may be collapsed or folded without the dividing curtain interfering with the said folding or without injury to the said dividing curtain, due to the folding of the said top.

A further object of this invention is to provide a dividing curtain and a fixture therefor which will support the dividing curtain above the front seat of a vehicle, the said support being movable to a position parallel with the bow of the top to which it is applied or being adjustable to stand at an angle to said bow, according to the requirements in practice, means being also provided for limiting the movement of the support for the dividing curtain in order that it may assume a position parallel with the said bow and in order that it may be prevented from passing a position parallel with the bow when traveling in one direction.

A still further object of this invention is to provide a support or bracket for the dividing curtain which may be adapted to tops of different widths, enabling the top manufacturers to utilize one type of bracket or support approximately universally.

A still further object of this invention is to produce bracket clamps which will permit the ready adjustment of the bracket to hold the said bracket or the curtain supporting portion thereof at a greater or less distance from the bow of the vehicle top to which the bracket clamps are applied, enabling the maker of the dividing curtain to position the support therefor in proper relation to the back of the front seat to which the dividing curtain is to be attached, it being furthermore an object of this invention to provide dividing curtains which may be folded and held in nested relation to the support therefor when the said dividing curtain is not in use.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 2:
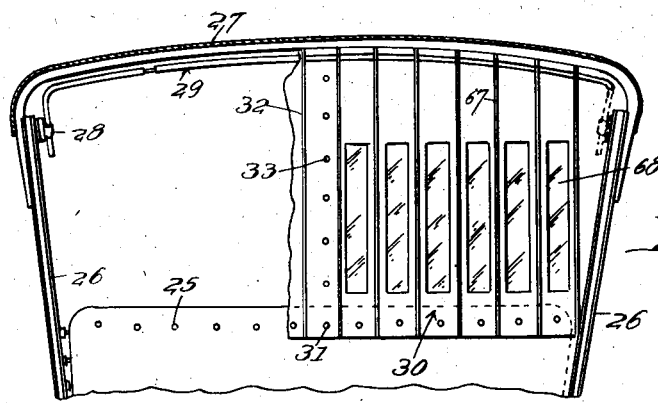
Figure 3:
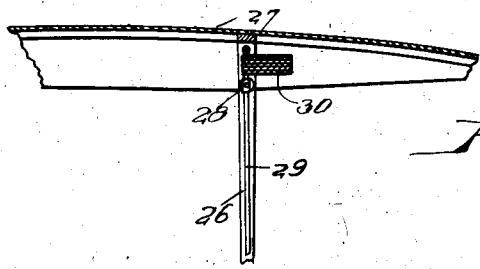
Figure 14:
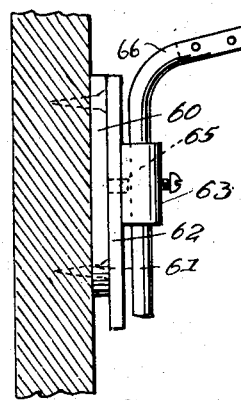
Figure 15:
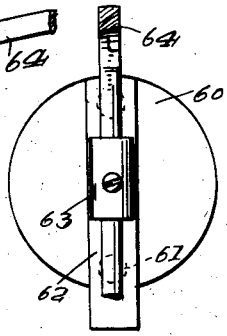
Figure 16:
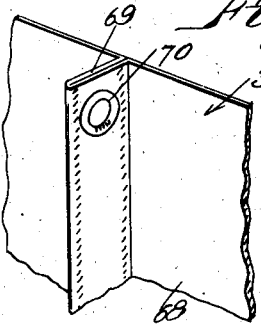
Figure 17:
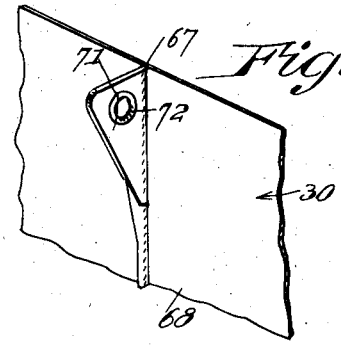
Figure 18:
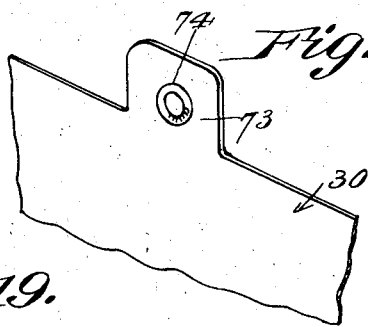
Figure 19:
Figures 20, 21:
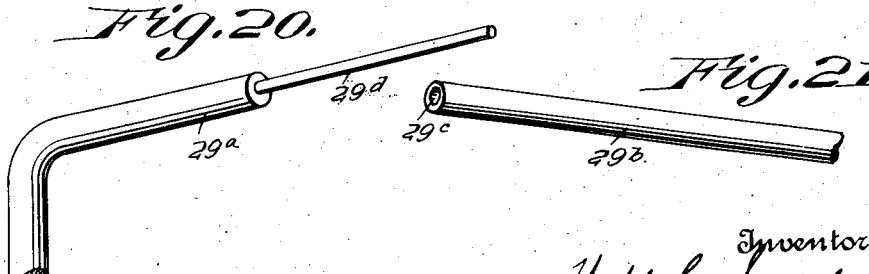

Figure 1 illustrates a sectional view of a front seat of a vehicle showing a fragment of the top and the dividing curtain associated therewith; Fig. 2 illustrates a transverse vertical sectional view of the vehicle top showing a fragment of a seat with the dividing curtain applied thereto; Fig. 3 illustrates a sectional view of a fragment of the vehicle top showing the dividing curtain folded; Fig. 4 illustrates a transverse sectional view of a fragment of the vehicle top showing the dividing curtain folded and held suspended with relation to the bracket or bow forming its support; Fig. 5 illustrates a sectional view of a clamp for the bracket or bow of the dividing curtain; Fig. 6 illustrates a top plan view thereof; Fig. 7 illustrates a bottom plan view thereof; Fig. 8 illustrates a sectional view of a bracket clamp slightly modified as compared with the bracket clamp shown in Figs. 5, 6, and 7; Fig. 9 illustrates a top plan view thereof; Fig. 10 illustrates a plan view of the base plate of the clamp; Fig. 11 illustrates a sectional view of a bracket or bow clamp embodying a further modification; Fig. 12 illustrates a plan view thereof; Fig. 13 illustrates a plan view of the base plate thereof; Fig. 14 illustrates a view in elevation partly in section of a device to be substituted for the bracket clamp to be used in conjunction with a wooden bow when the same is employed as a support for the dividing curtain; Fig. 15 illustrates a plan view thereof; Fig. 16 illustrates a perspective view of a fragment of a dividing curtain illustrating the means for connecting the said curtain to the supporting bracket or bow; Fig. 17 illustrates a perspective view of a fragment of the curtain showing a modified construction for suspending the said dividing curtain from the support; Fig. 18 illustrates a perspective view of a fragment of a curtain embodying a still further modification for connecting the said curtain to the support; Fig. 19 illustrates a longitudinal sectional view of the supporting bracket or bow showing the telescopic joint between the same for effecting the adjustment thereof to fit tops of different widths; Fig. 20 illustrates a perspective view of one section of the said bow or bracket; and Fig. 21 illustrates a perspective view of a fragment of the cooperating element thereof.

In these drawings 25 denotes the front seat of an ordinary automobile, the configuration of which may be changed to suit particular requirements; 26 illustrates the front bow of a top 27, but as these elements do not form a part of the present invention, it is obvious that they may be of any of the well known types.

It is the purpose of the inventor to provide the front bow 26 with a clamp for holding the bracket or bow which supports the dividing curtain and to that end, one of such clamps 28 is fastened on the inner surface of the bow on each side a convenient distance from the top, preferably at a point about or near the joint between the metallic sockets and the wooden bows now commonly used, although the position of the clamps is not material.

Associated with the clamps 28 is a bracket or bow 29 from which the curtain 30 is suspended, said curtain at its lower edge being preferably provided with any type of fasteners 31 by which it is secured to the back of the seat. When desired, the dividing curtain 30 may have a joint 32 transversely of the seat, the length of each section of the curtain being such that the said sections preferably overlap and the sections may be secured together by fasteners 33. When the dividing curtain is to be folded, the sections of the dividing curtain are detached at the joint 32 and the two sections are moved toward the sides of the top and adjusted or folded into the positions shown in Fig. 4 of the drawing, the sections of the curtain extending transversely of the top and in a horizontal position parallel with the horizontal portion of the bracket 29, the inner end of each section being suspended by a loop or strap 34 extending around the bracket 29, and the folded curtain. The bracket clamp shown in Figs. 5, 6, and 7 comprises a base plate 35 which may be secured to a bow by the screws 36 passing through the apertures 36$^a$, the said base plate having curved slots 37 therein, each having an enlarged portion 38 at one end, the enlarged portion of one of the slots being at the end opposite to that of the enlarged portion of the companion slot so that the enlarged portions may receive the heads 40 of the studs 41 which extend inwardly from the top plate 42. The inner surface of the base plate 35 is provided with channels 43 producing a clearance for the heads 40 of the studs 41 so that when the said heads are inserted in the enlargements of the slots, the top plate 42 may be turned on the base plate for the purpose of adjusting the position of the socket 44 carried by the top plate in order that it may stand at a proper angle with relation to the bow or that it may be moved to a position parallel with the bow when the top is to be folded. As shown, the said socket 44 has a set screw 45 for clamping the bow or bracket at different positions of adjustment so that its relation to the bow of the top and its position with relation to the back of the front seat of the vehicle to which the dividing curtain is applied may be regulated.

In Figs. 8, 9 and 10 I have illustrated a clamp embodying a modification and in which the base plate 46 is shown as having apertures 46$^a$ for receiving appropriate fastenings, the said base plate 46 having threaded studs 47 extending outwardly from the outer surface of the said base. The outer plate 48 has curved slots 49 therein adapted to receive the studs 47 and the plate 48 is held at different positions of adjustment with relation to the base 46 through the medium of the wing nuts 50 which are threaded on the studs 47 and bind against the outer plate so that the said outer plate is frictionally held in different positions of adjustment. The plate 48 has a socket 51 with a set screw 52 which serve to hold the bracket at different positions of adjustment. The modification just described provides means, as stated, for holding the bracket at different angles with relation to the top and it also is effective to carry the bow or bracket into a position parallel with the bow to which the clamping member is applied.

Figs. 11, 12 and 13 illustrate a further modification of a bow or bracket clamp and in this form the base 53 has apertures 53$^a$ for receiving fasteners and it also has a threaded stud 54, whereas the plate 55 which has the socket 56 thereon has a threaded aperture 57 to receive the threaded stud 54. It is obvious that the plate 55 may be turned or the stud 54 so that the socket 56 is brought to different positions with relation to the bow and as a means for retaining the plate 55 in proper position with relation to the plate 53 when the required adjustment has been attained, a set screw 58 is threaded through the plate 55 and is adapted to bear on the base plate 53 and retain the said parts in properly adjusted position. The socket 56 has a set screw 59 for clamping the bracket in the socket.

In Figs. 14 and 15, I show a device by which an ordinary bow may be suspended for holding a dividing curtain in which a base plate 60 is attached to an ordinary vehicle bow by fasteners such as screws 61, the said base plate 60 having a plate 62 with a socket 63. In this form, an arm 64 is adjustable in the socket 63 and the upper end of the arm is provided with means 66 for the reception of an ordinary wooden bow 64. This last mentioned modification when used in conjunction with said ordinary wooden bows will present advantages over known devices for such use, as it is well known that wooden bows are made of certain graduated sizes and the difficulties heretofore experienced in fitting vehicles with dividing curtains, in which the ordinary wooden bows are employed reside in part in the multiplicity of sizes necessary to be carried in stock by the curtain manufacturers and while this last mentioned modification will perhaps not be universally used owing to the difficulties experienced with the wooden bows, it nevertheless provides for an adjustment of the support for the dividing curtain so that the said support may stand at a proper angle with relation to the top and be adjusted to lie parallel with the bow of the vehicle top when the said top is to be folded.

The dividing curtain 30 may be suspended from the bracket or bow in a number of different ways and in Figs. 16, 17 and 18, I have illustrated some of the methods which may be employed for connecting the curtain to the said bow or bracket. It is to be understood that the dividing curtain is preferably to be of the folding type, the said curtain being provided with creases or folds 67, and further with panels 68 of some transparent material such as celluloid of such size and shape as may be desirable and as shown in Fig. 16, the curtain 30 may be folded on itself and stitched to form a flange 69 provided with an eyelet 70 adapted to receive the bracket or bow 29, so that the curtain may be slid along the bracket or bow that the said curtain may be nested in the manner heretofore described and as fully illustrated.

The modification shown in Fig. 17 illustrates the curtain 30 as having a tab 71 sewed to it, the said tab 71 being provided with an eyelet 72 to receive the bow or bracket.

In Fig. 18, I have illustrated a still further modification in which the curtain 30 has an integral tab or ear 73 provided with an eyelet 74 to receive the bow or bracket, and it is obvious that the dividing curtain may be suspended in any appropriate way without departing from the spirit of the invention.

As shown in Figs. 10, 20 and 21, the bow or bracket 29 is formed of tubular sections 29ª and 29ᵇ, the latter forming a socket 29ᶜ to receive a pin 29ᵈ which extends from the section 29ª, the said construction being provided for the purpose of enabling the manufacturer of the dividing curtain to adapt the bow or bracket to tops of different widths as it is obvious that the end of the section 29 may be cut off to reduce the length of such section in order that the bow or bracket of which it is a part may be fitted to the top to be supplied with the dividing curtain.

While I have referred to the element 29 in the alternative term bracket or bow, I wish to be understood by said term as meaning any support for the dividing curtain which may be held by the clamps and to avoid alternative terms in the claims, the said element 29 will be referred to in the claims as a "bracket" by which the inventor intends to cover any equivalent element.

I claim—

1. In an attachment for vehicle tops, clamping members, each comprising a base, a plate rotatable with relation to the base, means for holding the plate at different positions of adjustment, a socket carried by the plate, a bracket having arms slidable in the sockets of the clamping members, said clamping members being adapted to be secured to a bow of a vehicle top, with the arms of the bracket in the sockets of the said clamps whereby the said bracket may be held at an angle with relation to the bow or parallel therewith, and a dividing curtain suspended by the said bracket.

2. In an attachment for vehicle tops, clamping members, each comprising a base, a plate rotatable with relation to the base, means for holding the plate at different positions of adjustment, a socket carried by the plate, a bracket having arms slidable in the sockets of the clamping members, said clamping members being adapted to be secured to a bow of a vehicle top, with the arms of the bracket in the sockets of the said clamps whereby the said bracket may be held at an angle with relation to the bow or parallel therewith, and a dividing curtain and means for suspending the same from the said bracket, said dividing curtain being foldable on the arms of the bracket and adapted to lie parallel with the main portion of the bracket when in folded position.

3. In an attachment for vehicle tops, a bracket comprising telescopic sections, each of which is provided with an arm, clamps secured to a bow of a vehicle top, said clamps having sockets for the reception of the said arms of the clamps, means associated with the clamps for permitting adjustment of the brackets at angles with relation to the bow or to assume a position parallel to the said bow, a curtain, means for suspending the curtain from the bracket, said curtain being foldable and adapted to be moved from the bracket to the arms thereof for storage.

4. In an attachment for vehicle tops, a bracket having arms, sockets in which the arms of the bracket are slidable, members adapted to be secured to a bow of a vehicle, means whereby the sockets are supported by the members, means for securing the said sockets to the members in different positions of adjustment, means for retaining the arms in the sockets, a curtain, and means for suspending the curtain from the bracket, whereby the said curtain is foldable and adapted to be moved from the bracket to the arms thereof for storage.

In testimony whereof, I affix my signature in the presence of two witnesses.

WEBB C. SWEET.

Witnesses:
 LOTTIE E. BARKLEY,
 PEARL A. PUTNAM.